Patented Dec. 8, 1931

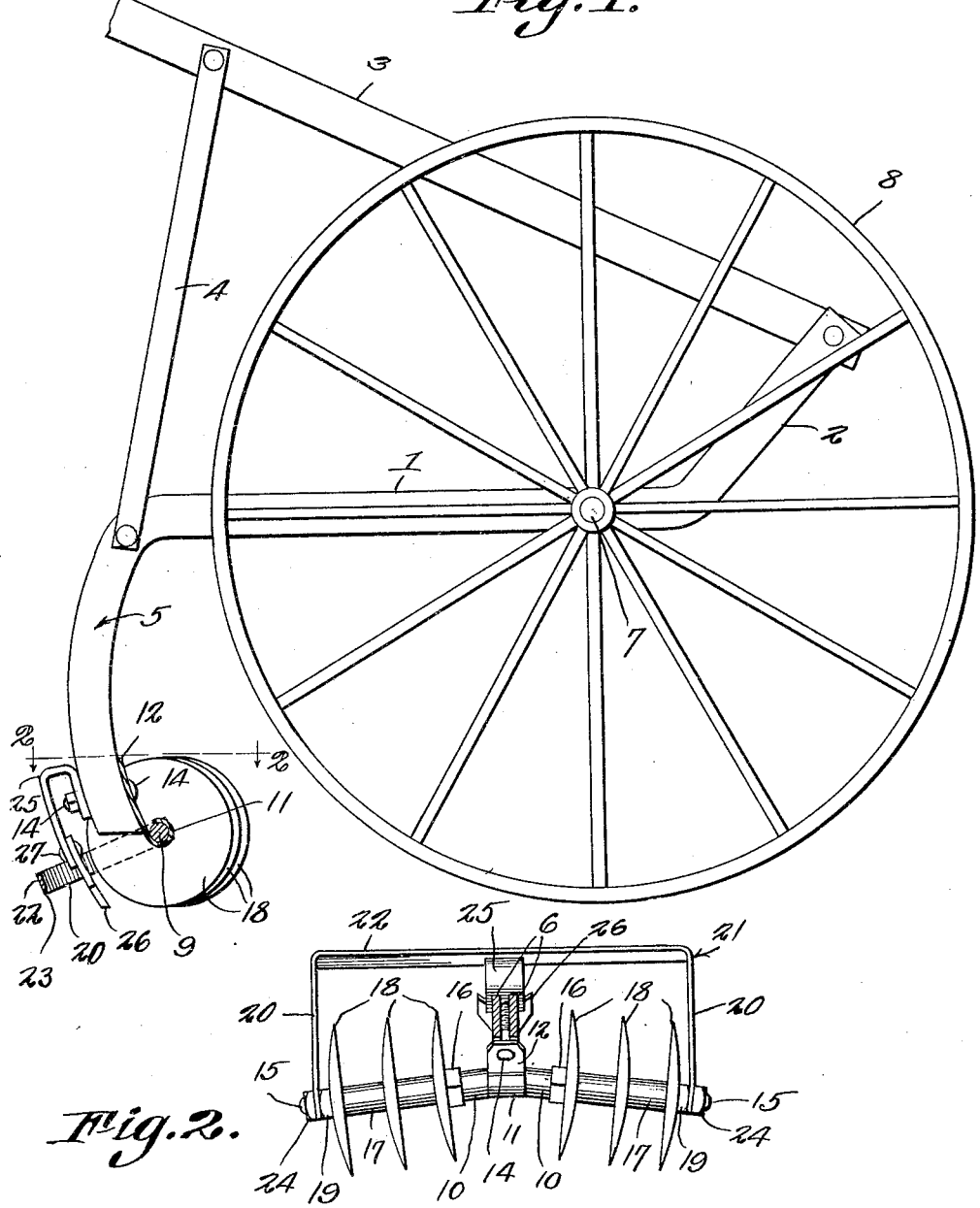

1,835,414

UNITED STATES PATENT OFFICE

GEORGE D. LUCAS, OF ABINGDON, ILLINOIS, ASSIGNOR OF ONE-HALF TO LEWIS H. ROBERTSON, OF ABINGDON, ILLINOIS

GARDEN CULTIVATOR

Application filed January 2, 1931. Serial No. 506,226.

This invention aims to provide a garden cultivator which will be effective in operation, simple in construction, and capable of being attached to any standard garden plow.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Figure 1 shows, in vertical section, a device constructed in accordance with the invention, mounted upon the frame work of a garden cultivator, the frame work being shown in elevation;

Figure 2 is a transverse section on the line 2—2 of Figure 1 and showing the complete attachment in plan.

In the drawings, there is shown a portion of a garden plow embodying frame bars 1 having upturned forward ends 2, to which are connected rearwardly extended handles 3, sustained by braces 4 from the frame bars 1. The rear ends of the frame bars 1 form the parallel members 6 of a standard 5. It is with such a machine, or with any other equivalent garden plow structure, that the device forming the subject matter of this application is adapted to be assembled.

An axle 7 is mounted on the frame bars 1 and carries the rotatable ground wheels 8. In putting the present invention into practice, there is provided an axle 9, the constituent members 10 of which are located at an obtuse angle to each other. At its angle, the axle 9 is secured in an eye 11 formed at the lower end of a bracket plate 12, held by a securing element 14, such as a bolt, on the forward edge of the standard 5, the securing element passing between the parallel members 6 of the standard.

The members 10 of the axle 9 have reduced end portions 15, on which are threaded inner nuts 16, which form shoulders. On the reduced ends 15 of the axle members 10, tubular sleeves 17 are mounted to rotate, and these sleeves carry soil-engaging elements, such as disks 18. On the reduced ends 15 of the axle members 10 are mounted intermediate nuts 19, the sleeves 17 being rotatable between the nuts 19 and 16. The nuts 19 also form abutments for the arms 20 of a U-shaped weeder 21, the arms of the weeder being mounted on the reduced ends 15 of the axle members 10. Outer nuts 24 are threaded on the reduced ends 15 of the axle members 10, and bind the arms 20 of the weeder 21 securely against the nuts 19 and upon the ends 15 of the axle members 10. The weeder 21 may be adjusted, by swinging it upwardly and downwardly and by tightening up the nuts 24. Ordinarily, however, the weeder 21 assumes the downwardly and rearwardly inclined position of Figure 1, the rear bar 22 of the weeder 21 being sharpened more or less at its lower edge, as shown at 23, so as to sever the weeds the more readily.

The numeral 25 marks an inverted U-shaped support, the rear arm of which is somewhat longer than the forward arm thereof. The forward arm of the support 25 is held against the rear edge of the standard 5, by the bolt 14. A shovel 26 is held by a securing device 27 on the rear arm of the support 25. The shovel 26 is disposed within the weeder 21, between and behind the inner ends of the gangs of disks 18.

In practical operation, as the garden plow frame 1 is trundled over the ground, on the wheels 8, the disks 18 will work upon the soil, the weeds will be cut by the weeder 21 and the shovel 26 will operate between and behind the inner ends of the gangs of disks 18.

The disks 18, of course, may be reversed, to throw the dirt outwardly or inwardly, as the operator may require. It is possible, moreover, to fasten the bracket plate 12 and associated parts on the rear of the standard 5, instead of in front of it.

Having thus described the invention, what is claimed is:

1. In a device of the class described, an axle comprising members disposed at an obtuse angle to each other, means for securing the axle, at its angle, to a standard, a gang of cultivator disks journaled on each member of the axle, a U-shaped weeder having its ends secured to the axle members at the outer ends of the gangs and extended behind the gangs, a shovel located within the weeder and to the rear of the axle, behind and between the inner ends of the gangs, and means for mounting the shovel on a standard in the position stated.

2. In a device of the class described, an axle comprising members disposed at an obtuse angle to each other, means for securing the axle, at its angle, to a standard, a gang of cultivator disks journaled on each member of the axle, and a U-shaped weeder having its ends secured to the axle members at the outer ends of the gangs and extended behind the gangs.

In testimony that I claim the foregoing as my own, I have hereto affixed my signature.

GEORGE D. LUCAS.